United States Patent [19]

Minakami et al.

[11] Patent Number: 5,668,854
[45] Date of Patent: *Sep. 16, 1997

[54] DISTRIBUTED SYSTEM FOR CALL PROCESSING

[75] Inventors: Michael Ken Minakami, Sunnyvale, Calif.; Brian Hulse, Hunters Crescent, England; Jonathan Cook, North End Portsmouth, England; John Brian Pickering, St Cross Winchester, England

[73] Assignee: International Business Machine Corp., Armonk, N.Y.

[*] Notice: The term of this patent shall not extend beyond the expiration date of Pat. No. 5,471,521.

[21] Appl. No.: 539,983

[22] Filed: Oct. 6, 1995

Related U.S. Application Data

[63] Continuation of Ser. No. 156,193, Nov. 23, 1993, Pat. No. 5,471,521.

[30] Foreign Application Priority Data

Jul. 29, 1993 [GB] United Kingdom ............... 9315695

[51] Int. Cl.$^6$ .................. H04M 1/64; H04M 3/42
[52] U.S. Cl. .................. 379/88; 379/67; 379/90.1; 379/201
[58] Field of Search .................. 379/67, 88, 89, 379/90, 91, 201, 207, 216, 219, 225

[56] References Cited

U.S. PATENT DOCUMENTS

| | | | |
|---|---|---|---|
| 4,782,509 | 11/1988 | Shepard | 379/88 |
| 4,955,054 | 9/1990 | Boyd, Jr. et al | 379/269 |
| 4,959,854 | 9/1990 | Cave et al. | 379/157 |
| 4,975,905 | 12/1990 | Mann et al. | 370/85.1 |
| 5,052,038 | 9/1991 | Shepard | 379/88 |
| 5,136,631 | 8/1992 | Einhorn et al. | 379/67 |
| 5,179,585 | 1/1993 | MacMillan, Jr. et al. | 379/88 |
| 5,187,735 | 2/1993 | Garcia et al. | 379/88 |
| 5,193,110 | 3/1993 | Jones et al. | 379/94 |
| 5,199,062 | 3/1993 | Von Meister et al. | 379/67 |
| 5,204,894 | 4/1993 | Darden | 379/88 |
| 5,260,990 | 11/1993 | MeLampy et al. | 379/67 |
| 5,274,695 | 12/1993 | Green | 379/88 |
| 5,278,897 | 1/1994 | Mowery et al. | 379/212 |
| 5,283,888 | 2/1994 | Dao et al. | 395/500 |
| 5,333,266 | 7/1994 | Boaz et al. | 395/200 |
| 5,349,636 | 9/1994 | Irrabarren | 379/89 |
| 5,351,276 | 9/1994 | Doll, Jr. et al. | 379/67 |
| 5,381,466 | 1/1995 | Shibayama et al. | 379/88 |
| 5,384,829 | 1/1995 | Heileman, Jr. et al. | 379/67 |
| 5,465,290 | 11/1995 | Hampton et al. | 379/67 |
| 5,475,792 | 12/1995 | Stanford et al. | 395/2.42 |
| 5,479,488 | 12/1995 | Lennig et al. | 379/67 |
| 5,581,600 | 12/1996 | Watts et al. | 379/67 |

OTHER PUBLICATIONS

Conversant 1 Voice System; "Architecture and Applications", Robert J. Perdue, AT&T Technical Journal, vol. 65, No. 5, pp. 34–47 Oct. 1986.

"Voicetek Corporation VTK–300", Product Summary Oct. 1990.

*Primary Examiner*—Krista M. Zele
*Assistant Examiner*—Scott L. Weaver
*Attorney, Agent, or Firm*—Jeanine S. Ray-Yarletts

[57] ABSTRACT

A first computer workstation 10 includes a voice response unit for interfacing to a telephone network. The first computer workstation is attached by a communications link 18 to a second computer workstation 20, which includes a server to perform a particular voice processing function, such as text to speech, voice recognition, FAX-back, and so on. For inbound applications the first computer workstation forwards the incoming signal over the communications link to the server on the second computer workstation for real-time processing, whilst for outbound applications, the reverse process occurs.

37 Claims, 3 Drawing Sheets

DISTRIBUTED SYSTEM FOR CALL PROCESSING

This is a continuation of application Ser. No. 08/156,193 filed on Nov. 23, 1993, now U.S. Pat. No. 5,471,521.

BACKGROUND OF THE INVENTION

The present invention relates to a distributed system for interactively processing telephone calls.

Many systems are currently available for automatically providing services information to callers over the telephone. Often referred to as voice response units (VRUs), such systems have normally relied upon the use of dual tone multiple frequency (DTMF) signals from push-button telephones to obtain input from a caller, and responded largely with pre-recorded yoke segments. However, such a system is comparatively limited with respect to the sort of dialog that can be maintained with the caller, given the restricted range of acceptable inputs, and the need to pre-record any possible responses.

In order to make such communications more natural, and to greatly enhance the flexibility of such systems, it is desirable to equip VRUs with other voice processing technologies, such as voice recognition (to replace the DTMF input), and text to speech (TTS) (to replace pre-recorded voice). There are many varieties of voice recognition that might be considered: for example, voice recognition may operate for discrete words or for continuous speech, and may be speaker dependent, or speaker independent. Recognition vocabularies can range from perhaps 12 words (typically ten digits plus a couple of control words) to many thousands. Likewise, there is a considerable range of TTS technologies available.

Voice recognition and TTS applications tend to be computationally very intensive; for example, full speaker-independent, large vocabulary voice recognition typically requires 100 Mips of digital signal processing power. The requirement becomes even more acute when it is remembered that a VRU may handle perhaps 100 telephone lines simultaneously, lead to a potential maximum processing requirement of 10 Gips. For this reason most commercial systems use specially designed hardware to increase processing speed. These are typically available as PC adapter cards to be fitted into the VRU.

However, such cards in general must be designed for a particular system, dependent for example on the operating system (DOS or OS/2), computer architecture (ISA or Microchannel), and so on. This greatly restricts the options available to the customer who wishes to incorporate such function into a VRU, since the preferred adapter card may not be compatible with their VRU. Likewise it is difficult to optimize the different components of the system individually. The same problems may also occur even if only software components are involved: for example, a preferred voice mail product may not run under the same operating system as the preferred VRU.

SUMMARY OF THE INVENTION

Accordingly, the invention provides a method of interactively processing a telephone call in a distributed system comprising at least two computer workstation connected together by a communications link, in which the first computer is interfaced to the telephone network, said method comprising the steps of:

receiving an incoming telephone signal from the telephone network;

forwarding the incoming telephone signal over the communications link to a server means on the second computer workstation;

processing the incoming telephone signal at the server means and generating a response based upon the telephone signal;

transmitting the response from the server means to the first computer workstation, and processing said call at the first computer workstation in accordance with said response.

The invention also provides a method of interactively processing a telephone call in a distributed system comprising at least two computer workstations connected together by a communications link, in which a first computer workstation is interfaced to the telephone network, said method comprising the steps of:

receiving an incoming telephone signal over said telephone network;

sending a request over the computer network to a server means on the second computer workstation;

generating a telephone signal at the server means based on said request and transmitting the telephone signal to the first computer workstation;

forwarding the generated telephone signal at the first computer workstation out over the telephone network.

The use of a distributed system in which the first computer is primarily responsible for handling the telephone call, and the second computer is primarily responsible for performing the desired technical processing, leads to great flexibility in system design, and so allows optimum technologies to be used in all areas. The server means, which effectively constitutes a remote resource, may be used to provide voice recognition, text-to-speech, voice mail, FAX-back (where a FAX is sent back to the caller), or any other desired facility. These can be divided into inbound and outbound server applications. In the former, such as voice recognition, the server receives an incoming telephone signal (i.e. the voice of the caller) to process. In the latter, such as text to speech or FAX back, the server produces a telephone signal (synthesized speech or a FAX message) which is transmitted back to the caller. Some applications involve both inbound and outbound processing; for example, a voice mail card will store incoming telephone signals during the record phase, and but play them out later when the voice mail is examined. The telephone signal may (if desired) be compressed for transmission between the two computer workstations.

It is preferred that the method further comprises the step of a resource controller, located on a computer workstation connected to a said first computer workstation by a computer link, maintaining a list of available server means and current usage thereof, wherein the first computer workstation requests access to the server means from the resource controller, and the resource controller responds to the first computer workstation whether or not the requested server means is available. The resource controller will typically be located on the second computer workstation, but might also be on some third workstation. In some situations it may be convenient to have a single resource control that handles all classes of server (e.g. voice recognition, text to speech, and so on), but in general it is more convenient to have one resource controller for each class of server.

The preferred initialization process involves the first computer workstation broadcasting a request to locate the resource controller, and the resource controller responding to the request by sending a message to the first computer workstation specifying the location of the resource controller. An alternative approach would be for the resource controller to send out a broadcast indicating its availability whenever it is brought up.

The invention also provides a distributed system for interactively processing a telephone call, comprising at least two computer workstations connected together by a communications link, the first computer workstation including interface means for attachment to the telephone network and for receiving an incoming telephone signal over said telephone network; means for forwarding a request over the computer network to a second computer workstation; and means for receiving a telephone signal from the second computer, and forwarding said telephone signal to the interface means for transmission out over the telephone network;

the second computer workstation including server means for generating a telephone signal based on the received request, and means for transmitting the telephone signal to the first computer workstation.

The invention further provides a distributed system for interactively processing a telephone call, comprising at least two computer workstations connected together by a communications link, the first computer workstation including interface means for attachment to the telephone network and for receiving an incoming telephone signal over said telephone network; means for forwarding the telephone signal over the communications link to a second computer workstation; and means for receiving a response from the second computer, and for processing the telephone call in accordance with the response;

the second-computer workstation including server means for receiving the incoming telephone signal over the communications link and generating a response based upon the incoming signal, and means for transmitting the response to the first computer workstation.

The first and second computer workstations must be linked in a manner providing sufficient bandwidth to support the interactive or real-time processing of the telephone call. A particularly suitable arrangement is for the first and second computer workstations to both be nodes on a local area network (LAN), preferably one having a 16 MBit/s bandwidth. Providing the traffic on the LAN is not unduly heavy, this should allow for example, in a text-to-speech application, synthesized voice to be played out over the LAN without undue delay. Note however; that the situation may become more difficult if the server can support several conversations simultaneously, since in this case the bandwidth requirements arc correspondingly increased.

As referred to above, there is preferably a resource controller located on a computer workstation in said local area network, the resource controller maintaining a list of available server means and current usage thereof, and responding to requests from the first computer workstation for access to the server means by notifying the first computer Workstation whether or not the requested server means is available. Typically there is one resource controller in the network for each class of available server means.

In one preferred configuration, the LAN includes at least two computer workstations interfaced to the telephone network, and the resource controller controllers) manage access from any of the at least two computer workstations to the server means. This has the advantage that multiple computer workstations can share a single server means (e.g. a single voice recognition unit), which avoids the cost of having to equip each voice response system with such a voice recognition unit.

It should be appreciated that the open architecture of the present invention enables a great variety of possible configurations. For example, within a single LAN a number of voice response units may be supported by a suite of different server devices (text to speech, voice recognition, and so on). The servers may be all be located on one workstation, or may be distributed across two or more machines.

BRIEF DESCRIPTION OF THE DRAWINGS

An embodiment of the invention will now be described by way of example with reference to the following drawings.

DETAILED DESCRIPTION OF THE PREFERRED EMBODIMENT

Figure 1:
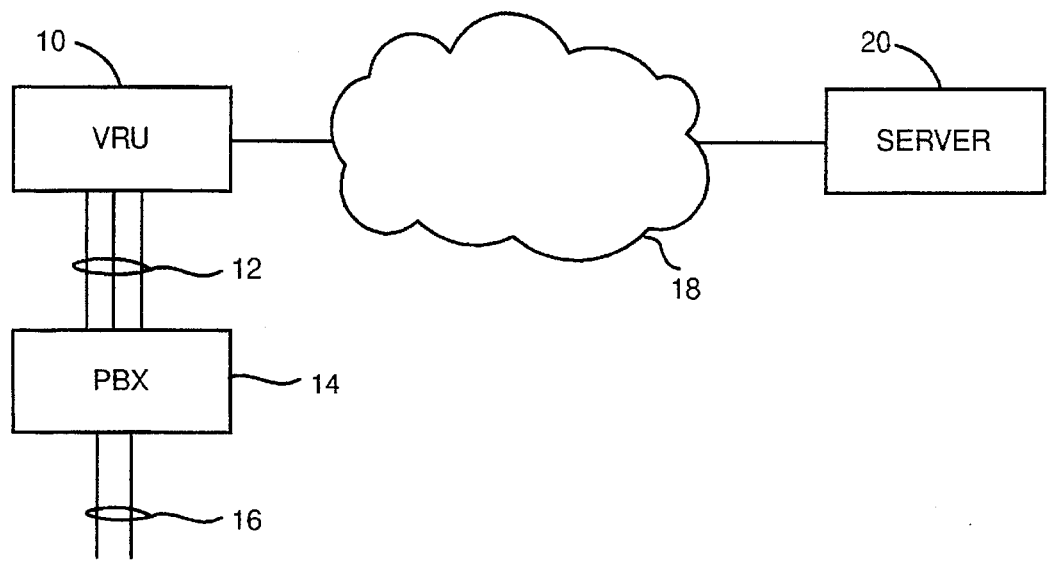
FIG. 1 is a high-level overview of a distributed system according to the invention.

FIG. 1 shows a voice processing system in which a first computer workstation 10, a voice response unit, is connected to a plurality of telephone lines 12 leading to a Private Branch Exchange (PBX) 14. The telephone lines may be either analog or digital: in the latter case, there will normally be only a single physical link, with some form of multiplexing. Also shown are trunk lines 16 leading from the exchange into the telephone network. It should be appreciated that in some instances the PBX will not be present, in which case the first computer workstation may be connected to lines leading directly into the telephone network.

The first computer workstation is connected to a second computer workstation 20 by a local area network (LAN) 18. This may for example be a Token Ring network, such as available from IBM Corporation, an Ethernet, or any other form of network that provides sufficient bandwidth and response times to allow interactive real-time processing of a telephone call.

Figure 2:
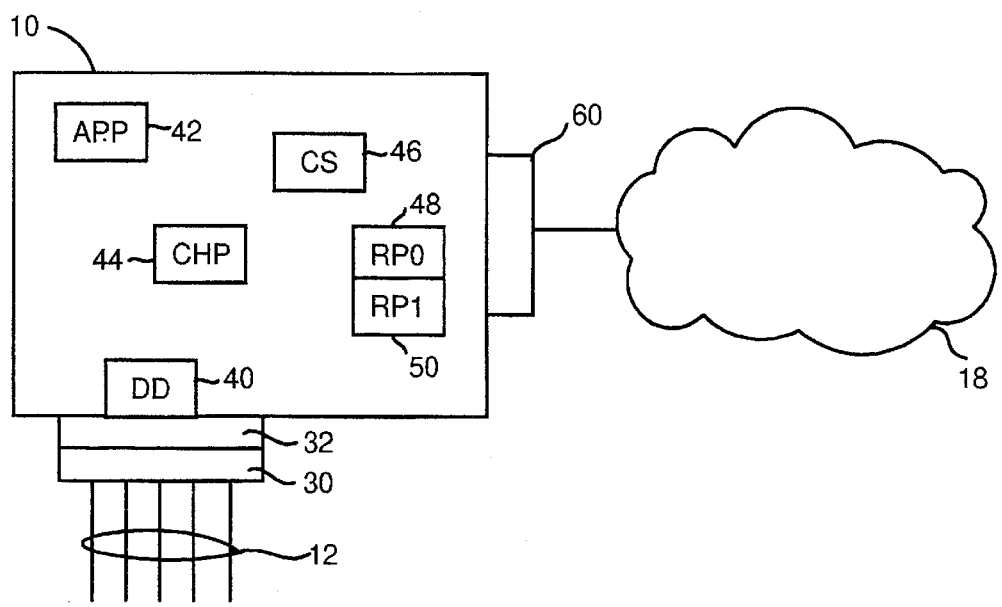
FIG. 2 is a detailed diagram of the configuration of the first computer workstation.
Figure 3:
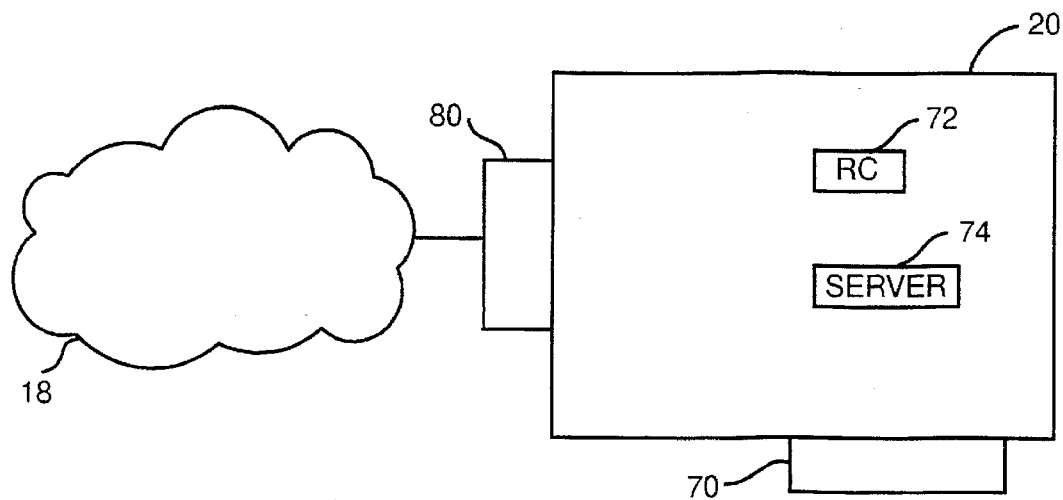
FIG. 3 is a detailed diagram of the configuration of the second computer workstation.

In one particular implementation of the invention, the first computer workstation is a RISC System/6000 running the DirectTalk/6000 software product (both available from IBM Corporation). The second computer workstation is a standard IBM compatible PC with an AT-BUS equipped for example with a VPRO-84 Voice Recognition Card, available front Voice Processing Corporation, Massachussetts, USA. Communications between the first and second computer workstations are carried out using the TCP/IP protocol. This is a conventional protocol based on point to point communications between a port on a first process and a port on a second process (in fact it is possible for the two processes to be on the same machine). Both computer workstations are equipped with suitable adapter cards (as shown in FIGS. 2 and 3) which allow data to be sent between the two workstations in accordance with this protocol. Such communications systems are well-known in the art and will not be described in more detail.

FIG. 2 illustrates the main components of the first computer workstation running DirectTalk/6000 on an RISC System/6000 under the Advanced Interactive Executive (AIX) operating system. This system accepts digital T1 or E1 trunks 12 from the PBX: in the former case, ie in the U.S., 24 individual channels are multiplexed together into a single trunk, with 8 bits per channel (standard µ-law) and a sampling rate of 8 kHz. The system is attached to the PBX via a digital trunk processor 30 (the 9291 or 9295 cards), plus a digital trunk adapter card 32 located inside the RISC System/6000 itself. These two cards provide the interface to the telephone network, and are responsible e.g. for demultiplexing incoming calls, and multiplexing outgoing calls. Incoming calls are aggregated into 20 ms blocks of data before being passed on for further processing.

Telephone signals are received from the digital trunk adapter card by a device driver 40, as known in the art, which is responsible for buffering the signals so that they can be collected for processing by other system components. Likewise, the device driver is responsible for receiving outgoing messages from the system and forwarding them to the digital trunk adapter card for transmission onto the telephone network. Data is read from and written to the device driver in accordance with standard programming techniques.

FIG. 2 illustrates the main processes running on the RISC System/6000 that are necessary for an understanding of the invention (note the device driver is not an actual process itself, but rather a task running under the operating system kernel). The overall operation of the workstation is supervised by an application program 42, which consists of a set of high level commands. These commands are interpreted by the channel processor 44 (CHP) which is responsible for allocating resources inside the computer, and establishing connections as required between the various processes. In accordance with the present invention, it is possible for an application to request a resource that is effectively external to the system: in other words the resource is to be supplied by a server on another machine. In this situation, the channel processor requests a custom server process 46 to obtain access to the remote resource. Actual data exchange between the first computer workstation and the server is controlled by a resource processor 48,50, via a network interface card 60. The number of resource processors, which are started at initialization by the custom server, can be configured, for example according to the expected system load. During call processing, the resource processor transfers data directly to or from the device driver to allow rapid flow of data between the telephone lines and the server.

FIG. 3 illustrates the processes that are active on the second computer workstation 20—the structure of this system is in fact very similar to that of the first computer workstation. There is a card 70 which in this particular implementation provides a voice recognition facility, but could be used for example to offer FAX, text to speech, and so on (there is a device driver associated with card 70, but this has not been shown since it is not relevant to an understanding of the present invention). A resource server 74 acts as a front end to the card, allowing off other machines to interact with the card, sending voice data into it and receiving back recognized text. Typically the server and associated card can handle several incoming or outgoing channels simultaneously. The second computer workstation also includes a resource controller 72, which maintains a table of all available servers, together with updated information on their current usage. Finally, the second computer workstation also includes a network interface card 80 to enable communications over the LAN 18.

Figure 4:
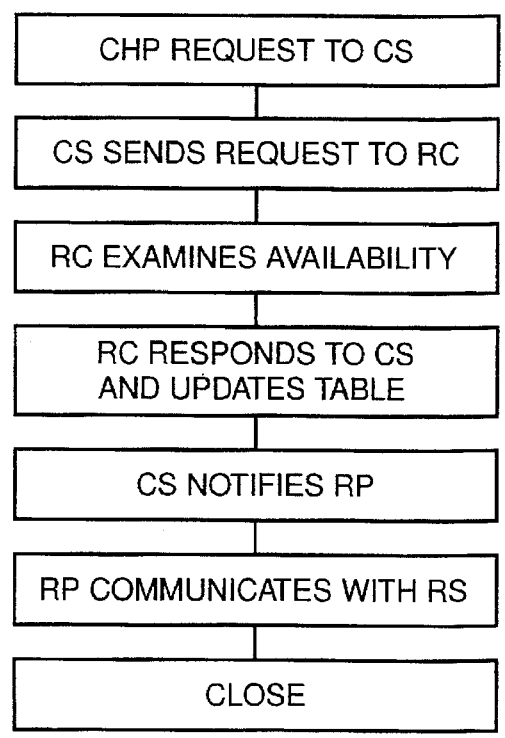
FIG. 4 is a flowchart illustrating the formation of a connection between a voice response unit and a server.

The sequence of events whereby a remote resource can be utilized is illustrated in FIG. 4. The process begins with the Channel Processor (CHP) sending a request to the custom server to provide access to the resource. In the present implementation, the CHP and the custom server communicate by means of an application programming interface (API) in the CHP. During initialization, the custom server calls the CHP, effectively informing the CHP of its existence. The custom server then regularly calls the CHP to see if it has any instructions for it (ie.whether there is an outstanding request for an external resource).

The custom server 46 now sends a datagram out to the resource controller 72 (a datagram is a special type of message available in AIX: it is used because the resource controller may be supporting more than one voice response unit, and must be open to receiving requests from any machine). The datagram identifies the resource required by the custom server 46. The resource controller 72 then checks its table of available resources, and their current status, and assuming for the moment that the request can be satisfied, returns a message to the custom server 46 containing information identifying the allocated server 74 (the network address and IP port of the server). The resource controller 72 then updates its table of available resources. The custom server 46 forwards the location information onto the resource processor 48,50 that will handle the particular server 74 allowing the resource processor 48,50 to communicate directly with the server 74. The custom server 46 and resource controller 72 play no further part in this stage of communications. Finally, when the processing of the server 74 has terminated, the communication between the server 74 and the resource processor 48,50 can be concluded, and the custom server 46 and resource controller 72 notified accordingly.

If instead it turns out that the remote resource requested by the customer server 46 is not in fact available, for example the relevant server is already being fully utilized, then clearly the resource controller 72 returns a negative response to the custom server 46. This response may indicate a suggested time to try again.

Figure 5:
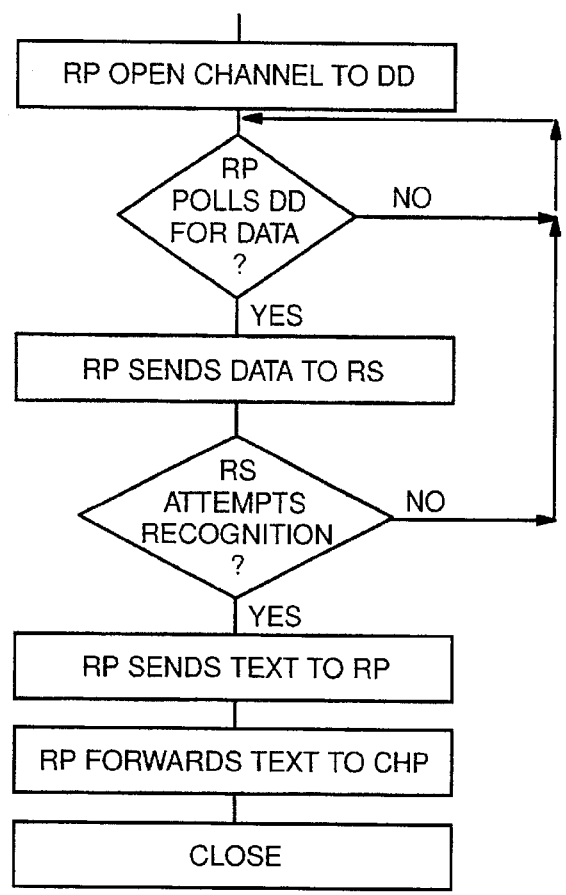
FIG. 5 is a flowchart illustrating in more detail the operation of the system with a voice recognition server.

FIG. 5 shows in more detail the processing associated with a particular inbound application (voice recognition of discrete digits) once communication between the resource processor 48,50 and the remote server 74 has been established. A logical connection is made between the resource processor 48,50 and the device driver 40 (in AIX terminology, a stream is set up between a port on the device driver and a port on the resource processor 48,50). This allows the resource processor to read data directly from the device driver 40 (this is much faster than allowing the CHP 44 to do the routing, which is particularly important given the need for real-time processing of the call with minimum delay). Once this connection has been established, the resource processor 48,50 repeatedly polls the device driver 40 to see if any data has arrived. Whenever it obtains a positive response, it collects the data, forms it into a packet (or packets) together with appropriate control information, and then sends it over the network to the server 74. The server 74 attempts to identify the digit which has been spoken based on the received signal: if the attempt is unsuccessful, the server 74 must wait for more data. Once a successful recognition has been made, the server 74 can return the spoken digit to the resource processor 48,50, which can forward the information to the channel processor 44 (for return to the application), and close down communications between the resource processor 48,50 and the server 74.

The initialization of the distributed system is as follows. When the second computer workstation 20 is initialized, each of the servers 74 or resources 70 notifies the resource controller 72 of its existence, along with the number of ports that can be utilized for call processing. The resource controller 72 can then make the appropriate entries in its resource table for each server 74. Next, when the first computer workstation 10 is initialized, the custom server 46 broadcasts a message over the LAN in order to locate the resource controller 72. This produces a response from the resource controller 72 including the address of the machine 20 on which the resource controller 72 resides. Note that if the first computer workstation 10 comes up before the resource controller 72, so that it does not receive any response to its broadcast message, it simply repeats the message until the resource controller 72 has been started and can reply.

One potential problem with the distributed system so far described is the possibility of packet loss somewhere in the network. To obviate this, whenever a packet containing either data or a command is sent between the resource processor 48,50 and the server 74, an acknowledgement is expected. Each packet is stored in a queue after transmission and only deleted after the acknowledgement has been received (the identification of packets is discussed in more detail below). If a specified number of retransmissions occur, without any acknowledgement being received, it is assumed that the connection between the resource processor 48,50 and the server 74 has gone down, and appropriate error recovery procedures are initiated.

According to the implemented communication protocol, each packet has a basic 8-byte header, to which further information or data may be appended. The header includes fields identifying the type of packet (discussed in more detail below), various control flags, channel and sequence numbers (again discussed below), information about the length of the packet following the header, and error checking bytes.

The channel id contained in each packet header specifies the channel to which the packet relates. The sequence number (which relates only to packets with that channel id) allows the loss of individual packets to be detected, and a re-transmission request sent if necessary. It also helps ensure that incoming packets are correctly sequenced at the receiving end. The channel id is required bearing in mind that the resource processor 48,50 and server 74 may be handling several different telephone calls simultaneously. Each call is assigned its own channel, to ensure that traffic on one line does not get confused with traffic on another line (this identification scheme could be extended if the network included several VRUs, as discussed below with reference to FIG. 6). A unique channel id of zero is assigned to communications between the custom server 46 and the resource controller 72 (this channel is not associated with any one particular telephone call).

The different types packets will now be described for the various stages of operation described earlier. The initialization procedure commences with the custom server sending out an IDENTIFY packet containing its own IP port and address (this is broadcast in datagram mode). The packet specifies a predetermined port number (1500, in the actual implementation), and any resource controller having a port number matching this responds with an AVAIL packet identifying itself and its whereabouts to the custom server. The IDENTIFY packet is re-sent using a linear or possibly exponential delay if no response is received immediately.

Once the resource controller has been located, the custom server sends a CHANOPEN packet to the IP address and port specified in the AVAIL response to the initial IDEN-TIFY packet. The purpose of this is simply to confirm the link to the resource controller. The initialization procedure is completed when the custom server receives an acknowledgement to its CHANOPEN packet from the resource controller.

The CHANOPEN/acknowledgement procedure is also used whenever a new channel is opened between a resource processor and a server to confirm that the channel is operational. Two types of packet, RESEND and RESTART, are provided to handle the situation where packets are lost, as mentioned above. The first of these, RESEND, identifies a particular packet to be resent, for example if examination of the sequence numbers indicates that a packet has not arrived. RESTART by contrast is used where data communications have been more seriously disrupted, and it is decided to recommence the sequence or packet transmission either from the beginning or from some specified packet sequence number.

The CHANREQ packet is sent by the custom server to request a particular service from the resource controller (the packet contains an identification of the desired service). If available, the acknowledgement to this packet will contain the IP port and address of the desired server; if the response is negative, the custom server must decide whether to retry later or abort the attempt. One further aspect is that the acknowledgement may indicate that the server requires application initialization data to be downloaded from the custom server machine to the server machine: should this be the case, the custom server handles the transmission of the relevant data.

After communications between the server and the resource processor have come to a conclusion, a CHANREL packet is sent by the resource processor. The server should sends an acknowledgement back, closes the relevant port, and notifies the resource controller of its updated status. In some applications it may be desirable for the resource processor always to have the same server available: in this case the CHANREL packet is not sent, so that the connection remains open.

Data are transferred using a DATADL packet, which contains free-format data, whether text to be converted into speech, voice signals for recognition, or whatever. In the case of voice recognition, many DATADL packets may be sent (each of which would be acknowledged) until recognition is successfully achieved and a result is available. This result is then returned to the resource processor attached to a RESULT packet. Text-to-speech operates slightly differently, in that both the text sent to the server, and the synthesized speech returned is transmitted in DATADL packets (again with each packet being acknowledged).

Voice data are transmitted over the LAN using conventional (ie uncompressed) 8-bit μ-law or A-law encoding (depending on the country). Although compression would help increase the rate of communication, it would be necessary for each server and voice response unit in the network to support the same compression algorithm. This would then have the undesirable effect of restricting which VRU could use which server. However, in more sophisticated systems, it may be possible for the resource processor and server to negotiate about compression as part of their initial exchange of messages. If it was determined that both did in fact support the same algorithm this could then be adopted for that communication session. Another possibility is that in future the LAN interface cards will perform compression, although this should be transparent to the sending and receiving applications.

The size of packets used to transmit voice data over the LAN can be adjusted to optimize performance, based on the particular application, network traffic, and so on. For example, text to speech applications may send large packets (4 kbytes) every 0.5 seconds, since this is efficient in terms of LAN utilization. By contrast, voice recognition may suit a smaller packet size, since not all the data may be required to identify the spoken input (especially if the recognition is limited to distinguishing between just a few possibilities). Note that the current system does not multiplex channels together. Thus if several channels (i.e. telephone lines) are being handled by the same resource processor and server, each channel will have its own stream and ports at each end. This allows each channel to be closed individually when it is no longer required, and avoids the additional overheads and complexity that would be required to support multiplexing.

Figure 6:
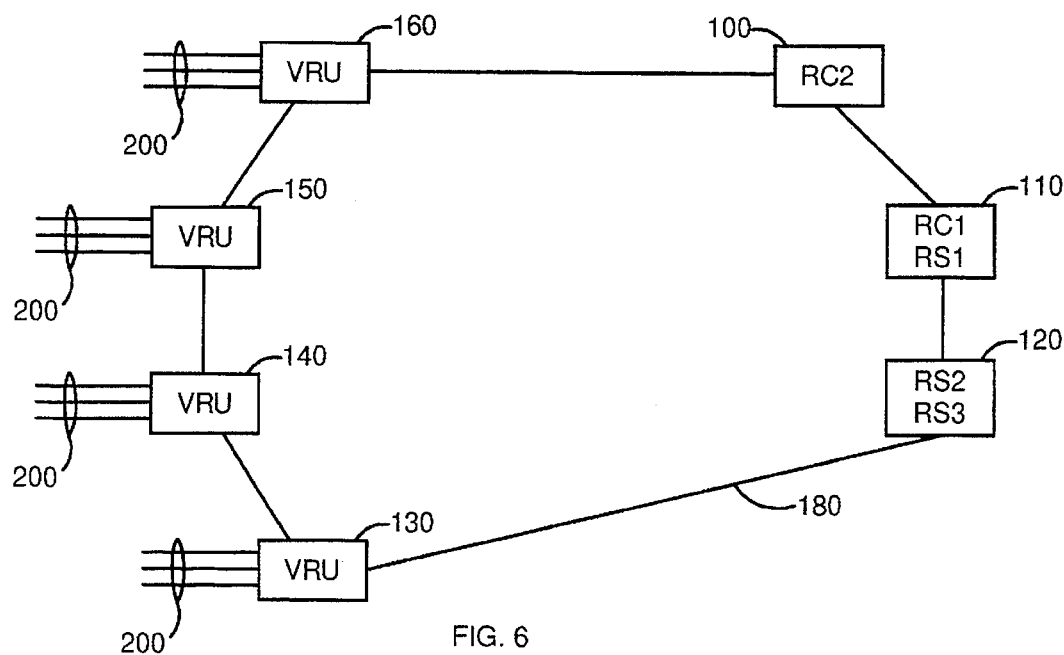
FIG. 6 is a diagram showing a more complicated configuration involving several voice response units.

FIG. 6 shows another distributed system for interactively processing a telephone call. This configuration is more complicated than that of FIG. 1, in that the LAN 180 now includes multiple voice response units 130, 140, 150, 160, which are capable of supporting a large number of telephone lines 200. Furthermore, there are also multiple resource controllers, RC1 and RC2 on nodes 110 and 100 respectively, and multiple servers, RS1 on first server machine 110 (offering perhaps TTS), and RS2 and RS3 on a second server machine 120 (offering voice recognition). Such a configuration effectively shares the servers amongst the VRUs, providing a wide range of function that would not be affordable if each VRU needed its own server.

Typically resource controller RC1 would manage allocation of server RS1, while resource controller RC2 would manage allocation of servers RS2 and RS3. In the present implementation, there is a separate custom server in each VRU for each resource controller (although this is entirely dependent on the design of any particular custom server). Thus the VRUs (130–160) would have support for two custom servers in order to offer both voice recognition and TTS. The functioning of each of these is analagous to the operation of a single custom server system as previously described.

We claim:

1. A distributed system connected to a telephone network for interactively processing a telephone call, comprising at least a first computer and a second computer connected together by a communications network, said distributed system having the ability to play out speech synthesized from text during the call, the first computer including Interface means for attachment to the telephone network for receiving a telephone signal over said telephone network and for transmitting a telephone signal out over said telephone network; means for forwarding a request over the communications network to the second computer, said request containing text to be synthesized; and means for receiving a voice data response from the second computer, and for forwarding said voice data response to the interface means for transmission over the telephone network;

the second computer including server means for generating said voice data response by performing a speech synthesis function on the text in the request from the first computer, and means for transmitting the voice data response to the first computer.

2. A distributed system connected to a telephone network for interactively processing a telephone call, comprising at least a first computer and a second computer connected together by a communications network, the first computer including interface means for attachment to the telephone network for receiving a telephone signal including a voice signal over said telephone network; means for forwarding the telephone signal over the communications network to the second computer; means for receiving voice data from the second computer; and means for providing a voice response to said call in accordance with said voice data;

the second computer including server means for generating said voice data by performing a voice recognition function on the voice signal in the telephone signal received from the first computer, and means for transmitting the voice data to the first computer.

3. The distributed system of claim 1, wherein the first and second computers are both nodes on a local area network (LAN), and said communications network is provided by the LAN.

4. The distributed system of claim 1, wherein the first computer further comprises means for broadcasting over the communications network a request, prior to receiving or processing said call, to initially access said server means.

5. The distributed system of claim 1, further comprising a resource controller for controlling access to the server means, said resource controller responding to a request to access said server means to indicate whether or not the server means is available to be accessed.

6. The distributed system of claim 5, wherein the resource controller is located on the second computer.

7. The distributed system of claim 1, wherein the distributed system further comprises a set of computers, said set of computers including the second computer, and each computer of said set being connected to the first computer by the communications network, the distributed system further including a resource controller located at a computer of the set of computers for maintaining a list of one or more available server means and the current usage thereof, and for responding to requests from the first computer for access to a desired server means by notifying the first computer whether or not the requested server means is available to be accessed.

8. The distributed system of claim 1, wherein the distributed system includes a third computer connected to said second computer by the communications network for processing a further telephone call, said third computer including interface means for attachment to the telephone network for receiving a telephone signal over said telephone network and for transmitting a telephone signal out over said telephone network; means for forwarding a further request over the communications network to the second computer, said further request containing text to be synthesized; and means for receiving a further voice data response from the second computer, and for forwarding said received further voice data response to the interface means of said third computer for transmission over the telephone network;

said server means on the second computer generating the further voice data response received by the third computer by performing a speech synthesis function on the text in the further request from the third computer, and transmitting the generated voice data response to the third computer.

9. The distributed system of claim 8, further comprising a resource controller for controlling access to the server means by said first and third computers.

10. The distributed system of claim 2, wherein the distributed system includes a third computer connected to said second computer by the communications network for processing a further telephone call, said third computer including interface means for attachment to the telephone network for receiving a further telephone signal including a voice signal over said telephone network; means for forwarding the further telephone signal over the communications network to the second computer; means for receiving further voice data from the second computer; and means for providing a voice response to said further telephone call in accordance with said further voice data;

said further voice data being generated by the server means at the second computer by performing a voice recognition function on the voice signal in the further telephone signal received from the third computer, and transmitted by the server means back to the third computer.

11. The distributed system of claim 10, further comprising a resource controller for controlling access to the server means by said first and third computers.

12. The distributed system of claim 2, wherein the first and second computers are both nodes on a local area network (LAN), and said communications network is provided by the LAN.

13. The distributed system of claim 2, wherein the first computer further comprises means for broadcasting over the communications network a request, prior to receiving or processing said call, to initially access said server means.

14. The distributed system of claim 2, further comprising a resource controller for controlling access to the server means, said resource controller responding to a request to access said server means to indicate whether or not the server means is available to be accessed.

15. The distributed system of claim 14, wherein the resource controller is located on the second computer.

16. The distributed system of claim 2, wherein the distributed system further comprises a set of computers, said set of computers including the second computer, and each computer of said set being connected to the first computer by the communications network, the distributed system further including a resource controller located at a computer of the set of computers for maintaining a list of one or more available server means and the current usage thereof, and for responding to requests from the first computer for access to a desired server means by notifying the first computer whether or not the requested server means is available to be accessed.

17. The distributed system of claim 9 or 11, wherein the resource controller is located on the second computer.

18. A distributed system connected to a telephone network for interactively processing first and second telephone calls, comprising at least a first computer, a second computer, and a third computer, connected together by a communications network, wherein said first computer handles said first telephone call, and said third computer handles said second telephone call, said system having the ability to play out speech synthesized from text during the first and second telephone calls, the first computer including first interface means for attachment to the telephone network for receiving a telephone signal over said telephone network and for transmitting a telephone signal out over said telephone network; means for forwarding a first request over the communications network to the second computer, said first request containing first text to be synthesized; and means for receiving a first voice data response from the second computer, and for forwarding said first voice data response to the first interface means for transmission over the telephone network;

the third computer including second interface means for attachment to the telephone network for receiving a telephone signal over said telephone network and for transmitting a telephone signal out over said telephone network; means for forwarding a second request over the communications network to the second computer, said second request containing second text to be synthesized; and means for receiving a second voice data response from the second computer, and for forwarding said second voice data response to the second interface means for transmission over the telephone network;

the second computer including server means for generating said first voice data response by performing a speech synthesis function on the first text in the first request from the first computer, and for generating said second voice data response by performing a speech synthesis function on the second text in the second request from the third computer; and means for transmitting the first voice data response and the second voice data response to the first computer and third computer respectively.

19. A distributed system connected to a telephone network for interactively processing first and second telephone calls, comprising at least a first computer, a second computer, and a third computer, connected together by a communications network, wherein said first computer handles said first telephone call and said third computer handles said second telephone call, the first computer including first interface means for attachment to the telephone network for receiving a first telephone signal including a first voice signal over said telephone network; means for forwarding the first telephone signal over the communications network to the second computer; means for receiving first voice data from the second computer; and means for providing a first voice response to said first telephone call in accordance with said first voice data;

the third computer including second interface means for attachment to the telephone network for receiving a second telephone signal including a second voice signal over said telephone network; means for forwarding the second telephone signal over the communications network to the second computer; means for receiving second voice data from the second computer; and means for providing a second voice response to said second telephone call in accordance with said second voice data; and the second computer including server means for generating said first voice data by performing a voice recognition function on the first voice signal in the telephone signal received from the first computer, and for generating said second voice data by performing a voice recognition function on the second voice signal in the telephone signal received from the third computer; and means for transmitting the first voice data and the second voice data to the first computer and the third computer respectively.

20. The distributed system of claim 18 or 19; wherein the first, second, and third computers are nodes on a local area network (LAN), and said communications network is provided by the LAN.

21. The distributed system of claim 18 or 19, further comprising a resource controller for controlling access to the server means, said resource controller responding to a request to access said server means to indicate whether or not the server means is available to be accessed.

22. The distributed system of claim 21, wherein the resource controller is located on the second computer.

23. A method of interactively processing a telephone call in a distributed system comprising at least a first computer and a second computer connected together by a communications network, whereby said first and second computers communicate by exchanging packets over said communications network, in which the first computer workstation is interfaced to a telephone network, said method comprising the steps of:

receiving at the first computer an incoming telephone signal from the telephone network;

forwarding the incoming telephone signal over the communications network to a server means at the second computer;

processing the incoming telephone signal at the server means by performing a voice recognition function on the incoming telephone signal and generating voice data representing the recognized telephone signal;

transmitting the voice data from the server means at the second computer to the first computer; and providing a voice response from the first computer to said telephone call at the first computer in accordance with said voice data.

24. A method of interactively processing a telephone call in a distributed system comprising at least a first computer and a second computer connected together by a communications network, whereby the first and second computers communicate by exchanging packets over said communications network, in which the first computer is interfaced to a telephone network, said method comprising the steps of:

sending a data request containing text from the first computer over the communications network to a server means in the second computer;

generating a voice telephone signal at the server means comprising speech synthesized from the text contained in the data request and transmitting the voice telephone signal to the first computer;

receiving the transmitted voice telephone signal at the first computer;

and forwarding the received voice telephone signal from the first computer out over the telephone network.

25. The method of claim 23 or 24, further comprising the step of a resource controller, located on a computer connected to said first computer by said communications network, maintaining a list of available server means and current usage thereof, wherein the first computer requests access to the server means from the resource controller, and the resource controller responds to the first computer workstation to indicate whether or not the requested server means is available.

26. The method of claim 25, wherein the resource controller is located on the second computer.

27. The method of claim 25 further comprising an initial step of the first computer broadcasting a request to the resource controller, and the resource controller responding to the request by sending a message to the first computer identifying the address of the resource controller within the communications network.

28. The method of claim 23 or 24 wherein the second computer includes a resource controller for managing access by said first computer to resources provided by the server means.

29. The method of claim 28, wherein the resource controller manages access to the server means by:

receiving a request from the first computer identifying a resource required by the first computer;

maintaining a table of available resources provided by the server means;

determining whether the requested resource can be satisfied, based on the available resources;

and if so, allocating the requested resource to the first computer, and responding accordingly to the first computer.

30. The method of claim 29, further comprising the step of notifying the resource controller when communication between the first computer and the allocated resource has terminated.

31. The method of claim 23 or 24, wherein said telephone call is processed under the control of an application running on said first computer.

32. The method of claim 31, further comprising the step of, responsive to the application requesting a resource external to said first computer for processing said telephone call, opening a channel between said first computer and the server means.

33. A method of interactively processing first and second telephone calls in a distributed system comprising at least a first computer, a second computer, and a third computer, connected together by a communications network, wherein said first and third computers are interfaced to a telephone network and said first computer handles said first telephone call, and said third computer handles said second telephone call, said system having the ability to play out speech synthesized from text during the first and second telephone calls, said method comprising the steps of:

forwarding a first request over the communications network from the first computer to the second computer, said first request containing first text to be synthesized;

forwarding a second request over the communications network from the third computer to the second computer, said second request containing second text to be synthesized;

generating at server means in the second computer a first voice data response by performing a speech synthesis function on the first text in the first request from the first computer, and generating at the server means in the second computer a second voice data response by performing a speech synthesis function on the second text in the second request from the third computer;

transmitting the first voice data response and the second voice data response to the first computer and third computer respectively;

receiving the first voice data response from the second computer at the first computer, and forwarding said first voice data response out over the telephone network;

receiving the second voice data response from the second computer at the third computer, and forwarding said second voice data response out over the telephone network.

34. A method for interactively processing first and second telephone calls, comprising at least a first computer, a second computer, and a third computer, connected together by a communications network, wherein said first computer handles said first telephone call and said third computer handles said second telephone call, the first computer including first interface means for attachment to the telephone network for receiving a first telephone signal including a first voice signal over said telephone network; means for forwarding the first telephone signal over the communications network to the second computer; means for receiving first voice data from the second computer; and means for providing a first voice response to said first telephone call in accordance with said first voice data;

the third computer including second interface means for attachment to the telephone network for receiving a second telephone signal including a second voice signal over said telephone network; means for forwarding the second telephone signal over the communications network to the second computer; means for receiving second voice data from the second computer; and means for providing a second voice response to said second telephone call in accordance with said second voice data; and the second computer including server means for generating said first voice data by performing a voice recognition function on the first voice signal in the telephone signal received from the first computer, and for generating said second voice data by performing a voice recognition function on the second voice signal in the telephone signal received from the third computer; and means for transmitting the first voice data and the second voice data to the first computer and the third computer respectively.

35. The method of claim 33 or 34 wherein the first, second, and third computers are nodes on a local area network (LAN), and said communications network is provided by the LAN.

36. The method of claim 35, further comprising the steps of:

receiving a request to access said server means at a resource controller from said first or third computer;

determining by said resource controller whether the requested resource can be provided by said server means;

and responding by said resource controller in accordance with said determination to said first or third computer.

37. The method of claim 36, wherein the resource controller is located on the second computer.

* * * * *